United States Patent
Ripy et al.

(10) Patent No.: US 7,200,732 B2
(45) Date of Patent: Apr. 3, 2007

(54) METHOD AND APPARATUS OF ADDING GRANT INFORMATION TO A MEMORY

(75) Inventors: Paul Brian Ripy, Guerneville, CA (US); Keith Quoc Chung, Durham, NC (US); Gary J. Geerdes, Santa Rosa, CA (US); Christophe Pierre Leroy, Rohnert Park, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 300 days.

(21) Appl. No.: 10/763,432

(22) Filed: Jan. 23, 2004

(65) Prior Publication Data

US 2005/0177665 A1     Aug. 11, 2005

(51) Int. Cl.
*G06F 12/02* (2006.01)

(52) U.S. Cl. .................. 711/200; 711/151; 711/156; 711/168; 711/169; 718/103

(58) Field of Classification Search ........ 711/167–169, 711/202, 206, 200, 151, 156; 718/103
See application file for complete search history.

(56) References Cited

U.S. PATENT DOCUMENTS

| | | | |
|---|---|---|---|
| 3,851,104 A | 11/1974 | Willard et al. .......... 179/15 BY |
| 4,586,175 A * | 4/1986 | Bedard et al. ............. 370/449 |
| 4,763,320 A | 8/1988 | Rudolph et al. ............. 370/85 |
| 4,814,974 A | 3/1989 | Narayanan et al. ......... 364/200 |
| 4,891,805 A | 1/1990 | Fallin ....................... 370/95.1 |
| 4,928,273 A | 5/1990 | Protopapas ................ 370/85.7 |
| 5,481,680 A * | 1/1996 | Larson et al. ............... 710/112 |
| 5,867,670 A | 2/1999 | Kim et al. ................... 395/293 |
| 6,034,960 A | 3/2000 | Beshai et al. ................ 370/395 |
| 6,035,361 A | 3/2000 | Kim et al. ................... 710/113 |
| 6,119,214 A | 9/2000 | Dirks ........................ 711/206 |
| 6,185,647 B1 | 2/2001 | Shibuya ..................... 710/107 |
| 6,286,083 B1 | 9/2001 | Chin et al. .................. 711/151 |
| 6,311,244 B1 | 10/2001 | Sheafor et al. ............ 710/107 |
| 6,512,769 B1 | 1/2003 | Chui et al. .................. 370/395 |
| 6,636,915 B1 | 10/2003 | Dabby et al. .............. 710/240 |
| 6,718,422 B1 | 4/2004 | Kelley et al. .............. 710/309 |

(Continued)

FOREIGN PATENT DOCUMENTS

WO     WO 99/55036     10/1999

OTHER PUBLICATIONS

"Real-Time Self-Granting, Centrally Directed Distributed Arbitration With Fairness", Mar. 1, 1995, IBM Technical Disclosure Bulletin, vol. 38, Issue 3, pp. 421-424.

(Continued)

*Primary Examiner*—Pierre Bataille
*Assistant Examiner*—Hetul Patel
(74) *Attorney, Agent, or Firm*—Mark C. Pickering

(57) ABSTRACT

A scrambling operation is used to space apart the grants that a communication circuit receives during a period of time, such as 512 arbitration periods. An operator can enter the number of arbitration periods that a communication circuit is to receive in blocks of sequential logical address ranges. The logical addresses are then changed to physical addresses that are spaced apart, thereby significantly reducing the buffering required by the communication circuit.

20 Claims, 7 Drawing Sheets

U.S. PATENT DOCUMENTS

| | | |
|---|---|---|
| 6,768,745 B1 | 7/2004 | Gorshe et al. ............... 370/421 |
| 6,907,491 B2 | 6/2005 | Moss ......................... 710/309 |
| 7,003,609 B2 | 2/2006 | Ripy et al. .................. 710/113 |
| 2002/0112106 A1 | 8/2002 | Henehan et al. ............ 710/113 |
| 2003/0115369 A1 | 6/2003 | Walter et al. ............... 709/253 |
| 2004/0064615 A1 | 4/2004 | Hammitt et al. ............ 710/107 |
| 2004/0081145 A1 | 4/2004 | Harrekilde-Petersen et al. . 370/362 |
| 2004/0267991 A1 | 12/2004 | Delaney ..................... 710/107 |

OTHER PUBLICATIONS

U.S. Appl. No. 10/669,192, filed Sep. 23, 2003, Ripy et al.

* cited by examiner

METHOD AND APPARATUS OF ADDING GRANT INFORMATION TO A MEMORY

BACKGROUND OF THE INVENTION

1. Field of the Invention

The present invention relates to a method and apparatus of allocating bandwidth on a bus-based communication system and, more particularly, to a method and apparatus of adding bus grant information to a memory that is used to grant access to a bus.

2. Description of the Related Art

A bus-based communication system is a system that allows a number of communication circuits to exchange signals with each other over a group of shared electrical pathways. For example, the communication circuits on service cards, such as xDSL and other line cards, can be connected to, and communicate over, a bus.

FIG. 1 shows a block diagram that illustrates a conventional bus-based communications system 100. As shown in FIG. 1, system 100 includes a cell bus 110 that has a first bus BUS-A and a pair of first-bus control lines SEL-A0 and SEL-A1. In addition, cell bus 110 also includes a second bus BUS-B, and a pair of second-bus control lines SEL-B0 and SEL-B1. First bus BUS-A utilizes a first group of electrical pathways, such as eight electrical pathways that represent eight bits, while second bus BUS-B utilizes a second group of electrical pathways, such as eight electrical pathways that represent eight bits.

As further shown in the FIG. 1 example, system 100 also includes a number of service cards 112 that are connected to cell bus 110. Each service card 112 is also connected to a number of network devices 114 to receive a number of streams of data cells DS. The data cells DS can have different priority levels such that a data cell DS from one network device 114 is preferred over the data cell DS from another network device 114.

Each service card 112 includes a communication circuit 116 that has a transmit circuit 120 that transmits data cells onto cell bus 110, and a receive circuit 122 that receives data cells from cell bus 110. Communication circuit 116 also includes a logic block 124 that processes the data cells DS.

In operation, when a number of communication circuits 116 are connected to cell bus 110, one of the communication circuits 116 assumes the role of bus master, while the remaining communication circuits 116 assume the roles of bus slaves and communicate over the bus as allowed by the bus master.

The bus master controls the timing of the bus along with access to the bus. For example, the bus master can define transmission periods on bus BUS-A and bus BUS-B, and determine the communication circuit 116 that has permission to use each of the transmission periods on the buses.

FIG. 2 shows a state diagram that illustrates a prior art state machine 200 operating as a bus master. State machine 200 is executed by the logic block 124 of the communication circuit 116 that is the bus master. As shown in FIG. 2, state machine 200 begins at state 210 by determining whether any requests to use bus BUS-B were received during a first request period.

Requests to use bus BUS-B are received during request periods where each communication circuit 116 that wishes to transmit a data cell over bus 110 outputs a request. The requests are output over select lines SEL-A0, SEL-A1, SEL-B0, and SEL-B1 to the bus master. Each request period can be, for example, 12 clock cycles long to support 24 communication circuits 116.

For example, a $1^{st}$ communication circuit can request bus BUS-B during a first-request clock cycle of a request period on select line SEL-A0 and SEL-A1, while a 13th communication circuit can request bus BUS-B during the first-request clock cycle on select lines SEL-B0 and SEL-B1. In addition, a $2^{nd}$ communication circuit can request bus BUS-B during a second-request clock cycle on select line SEL-A0 and SEL-A1, while a 14th communication circuit can request bus BUS-B during the second-request clock cycle on select lines SEL-B0 and SEL-B1. Thus, in this example, after 12 clock cycles, each of 24 communications circuits has had a one clock cycle opportunity to request control of bus BUS-B over select lines SEL-A0, SEL-A1, SEL-B0, and SEL-B1.

Each communication circuit 116 outputs a logic value onto the select lines SEL during its assigned clock cycle to indicate whether a request is being made and, if so, the priority level of the request. For example, a logic value of 0-0 can represent a high priority level, while a logic value of 0-1 can represent a medium priority level. In addition, a logic value of 1-0 can represent a low priority level, while a logic value of 1-1 can represent no request.

When requests are received during the first request period, state machine 200 moves to state 212 to define a group of requesting circuits that include the communication circuits 116 that submitted a bus control request during the first request period. For example, state machine 200 can define a group that includes only the communication circuits 116 that requested control of bus BUS-B during the first request period.

Following this, state machine 200 moves to state 214 to grant access to one of the group of requesting communication circuits to transmit in the next transmission period on bus BUS-B. Access is granted by outputting a grant to the requesting communication circuit 116 over the control lines SEL-B0 and SEL-B1. States 212 and 214 can be, for example, eight clock periods long. In addition, an error correction code can be transmitted at the same time on the select lines SEL-A0 and SEL-A1 that are not carrying the grant. Once the grant has been output, state machine 200 moves to state 216 to wait for a predefined period of time. The total time required to complete states 210–216 can be, for example, 26 clock cycles.

After the predefined time has expired, state machine 200 moves to state 218 to determine whether any requests to use bus BUS-A were received during a second request period. In the present example, one clock cycle before state machine 200 moves to state 218, the communication circuit 116 that received control over bus BUS-B, begins transmitting a data cell on bus BUS-B.

As with bus BUS-B, requests to use bus BUS-A are also received during a request period where each communication circuit 116 that wishes to transmit a data cell over bus 110 can output a request. The requests are again output over select lines SEL-A0, SEL-A1, SEL-B0, and SEL-B1 to the bus master, and the request period can also be 12 clock cycles long to support 24 communication circuits 116.

For example, a $1^{st}$ communication circuit can request bus BUS-A during a first-request clock cycle of a next request period on select lines SEL-B0 and SEL-B1, while a 13th communication circuit can request bus BUS-A during the first-request clock cycle on select lines SEL-A0 and SEL-A1. In addition, a $2^{nd}$ communication circuit can request bus BUS-A during the second-request clock cycle on select lines SEL-B0 and SEL-B1, while a 14th communication circuit can request bus BUS-A during the second-request clock cycle on select lines SEL-A0 and SEL-A1. Thus, in this example, 12 clock cycles after the request period for bus BUS-A began, each of 24 communications circuits has had a one clock cycle opportunity to request control of bus BUS-A over select lines SEL-A0, SEL-A1, SEL-B0, and SEL-B1.

When requests for bus BUS-A are received during the second request period, state machine 200 moves to state 220 to define a group of requesting circuits that include the communication circuits 116 that submitted a bus control request during the second request period. For example, state machine 200 can define a group that includes only the communication circuits 116 that requested control of bus BUS-A during the second request period.

Following this, state machine 200 moves to state 222 to grant access to one of the group of requesting communication circuits to transmit a data cell in the next transmission period on bus BUS-A. As above, access is granted by outputting a grant to the requesting communication circuit 116 over the control lines SEL-A0 and SEL-A1. States 220 and 222 can be, for example, eight clock periods long. In addition, an error correction code can be transmitted at the same time on the select lines SEL-B0 and SEL-B1 that are not carrying the grant.

Once the grant has been output, state machine 200 moves to state 224 to wait for a predefined period of time. The total time required to complete states 218–224 can be, for example, 26 clock cycles. After the predefined time has expired, state machine 200 returns to state 210 to repeat the process. In addition, if no requests are received during the first request period, state machine 200 waits until the end of the 26 clock cycle, and then moves from state 210 to state 218. Similarly, if no requests are received during the second request period, state machine 200 waits until the end of the 26 clock cycle, and then moves from state 218 to state 210.

Thus, state machine 200 moves through states 210–216, which define a first arbitration period, to determine and grant permission to transmit a data cell during the next transmission period on bus BUS-B, and then through states 218–224, which define a second arbitration period, to determine and grant permission to transmit a data cell during the next transmission period on bus BUS-A. As a result, state machine 200 provides an alternating series of arbitration periods where control over bus BUS-B is determined, and then control over bus BUS-A is determined.

FIG. 3 shows a graphical representation that further illustrates prior art state machine 200. As shown in FIG. 3, state machine 200 defines an alternating series of BUS-B and BUS-A arbitration periods 310 and 312, respectively, on control lines SEL-A0, SEL-A1, SEL-B0, and SEL-B1. The BUS-B arbitration period 310 can be implemented with, for example, states 210–216, while the BUS-A arbitration period 312 can be implemented with, for example, states 218–224.

In the FIG. 3 example, following a BUS-B arbitration period 310, the communication circuit 116 that received the grant begins transmitting a data cell on bus BUS-B one clock cycle before the next BUS-A arbitration period 312, and continues transmitting the data cell for a transmit period. The transmit period can be, for example, 52 clock cycles long.

Similarly, following a BUS-A arbitration period 312, the communication circuit 116 that received the grant begins transmitting a data cell on bus BUS-A one clock cycle before the next BUS-B arbitration period 310, and continues transmitting the data cell for the transmit period.

Thus, as shown in FIG. 3, when a communication circuit 116 receives control over one of the two buses, such as BUS-A, the circuit 116 transmits the data cell over the bus during the next two arbitration periods. By utilizing two 26-cycle arbitration periods and one 52-cycle transmit period, a single 52 byte ATM cell can be transmitted.

FIG. 4 shows a flow chart that illustrates a prior art method 400 of granting access to a bus to one of a number of requesting communication circuits. In the present case, each of the requesting communication circuits submitted a bus control request to the bus master during the same request period.

As shown in FIG. 4, method 400, which can be used to implement steps 214 and 222, begins at step 410 by identifying the requesting communication circuits 116 that wish to transmit a high priority data cell. Priority can be divided into different levels, such as high, medium, and low, and assigned to different data cells DS so that a data cell DS with a high priority is preferred over a data cell DS with a medium or low priority, while a data cell DS with a medium priority is preferred over a data cell DS with a low priority.

If no communication circuits with a high priority data cell requested control, method 400 moves to step 412 to identify the requesting communication circuits 116 that wish to transmit a medium priority data cell. If no communication circuits with a medium priority data cell requested control, method 400 moves to step 414 to identify the requesting communication circuits that wish to transmit a low priority data cell.

Once the requesting communication circuits within a priority level have been identified, method 400 moves from either step 410, step 412, or step 414 to step 416 to determine which of the communication circuits within the priority level will receive the grant (permission to transmit during the next transmission period).

When several requesting communication circuits 116 have the same priority level, the requesting communication circuit 116 to receive the grant can be defined by an arbitration, such as a declining round robin. In a declining round robin, the requesting communication circuits 116 circulate within a hierarchical ranking.

The requesting communication circuit at the top of the ranking is assigned the grant and, after receiving the grant, moves to the bottom of the ranking. The ranking of a communication circuit 116 increases each time the circuit is denied a grant, i.e., control of the bus.

One drawback with method 400 is that if the requesting communication circuits 116 with high priority data streams are over subscribed, method 400 can always or nearly always move from step 410 to step 416. As a result, the higher priority data cells DS can consume all of the available bandwidth, thereby preventing the lower priority data cells DS from being transmitted onto the bus. Thus, there is a need for a method and apparatus that grants access to a bus that insures that lower priority data streams are able to transmit information across the bus.

SUMMARY OF THE INVENTION

A method of adding grant information to a memory that stores information about a series of arbitration periods is disclosed in accordance with a first embodiment of the present invention. The method includes assigning a number of first addresses to a group of devices such that two or more consecutive first addresses are assigned to each device and no two devices have the same first addresses. The number of first addresses represents a corresponding number of arbitration periods such that each first address represents one arbitration period. Each first address has a sequence of bits.

The method also includes forming a number of second addresses from the number of the first addresses such that each first address has a corresponding second address and each second address has a corresponding device by rearranging the sequence of bits in a plurality of the number of first addresses. Each second address represents one arbitration period.

A method of adding grant information to a memory that stores information about a series of arbitration periods is disclosed in accordance with a second embodiment of the present invention. The method includes assigning a number of first addresses to a device. The number of first addresses represents a corresponding number of arbitration periods such that each first address represents one arbitration period. Each first address has a sequence of bits. The method also includes forming a number of second addresses from the number of the first addresses such that each first address has a corresponding second address by rearranging the sequence of bits in a plurality of the number of first addresses. The first addresses and second addresses have an equal number of bits. Each second address represents one arbitration period.

A method of adding grant information to a memory that stores information on a series of arbitration periods is disclosed in accordance with a third embodiment of the present invention. The method includes assigning a number of first addresses to a device. The number of first addresses represents a corresponding number of arbitration periods such that each first address represents one arbitration period. No two first addresses are identical. Each first address has a sequence of bits.

The method further includes forming a number of second addresses from the number of the first addresses such that each first address has a corresponding second address by rearranging the sequence of bits in a plurality of the number of first addresses. Each second address represents one arbitration period. No two second addresses are identical.

A communications circuit is disclosed in accordance with a fourth embodiment of the present invention. The communications circuit includes a transmit circuit that transmits information onto a bus, a receive circuit that receives information from the bus, and a memory that stores information on a series of arbitration periods. The communications circuit also includes a logic circuit connected to the transmit circuit, the receive circuit, and the memory. If grant information for a group of devices is to be added to the memory, the logic circuit assigns a number of first addresses to the group of devices such that two or more consecutive first addresses are assigned to each device and no two devices have the same first addresses. The number of first addresses represents a corresponding number of arbitration periods such that each first address represents one arbitration period. Each first address has a sequence of bits.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 5:
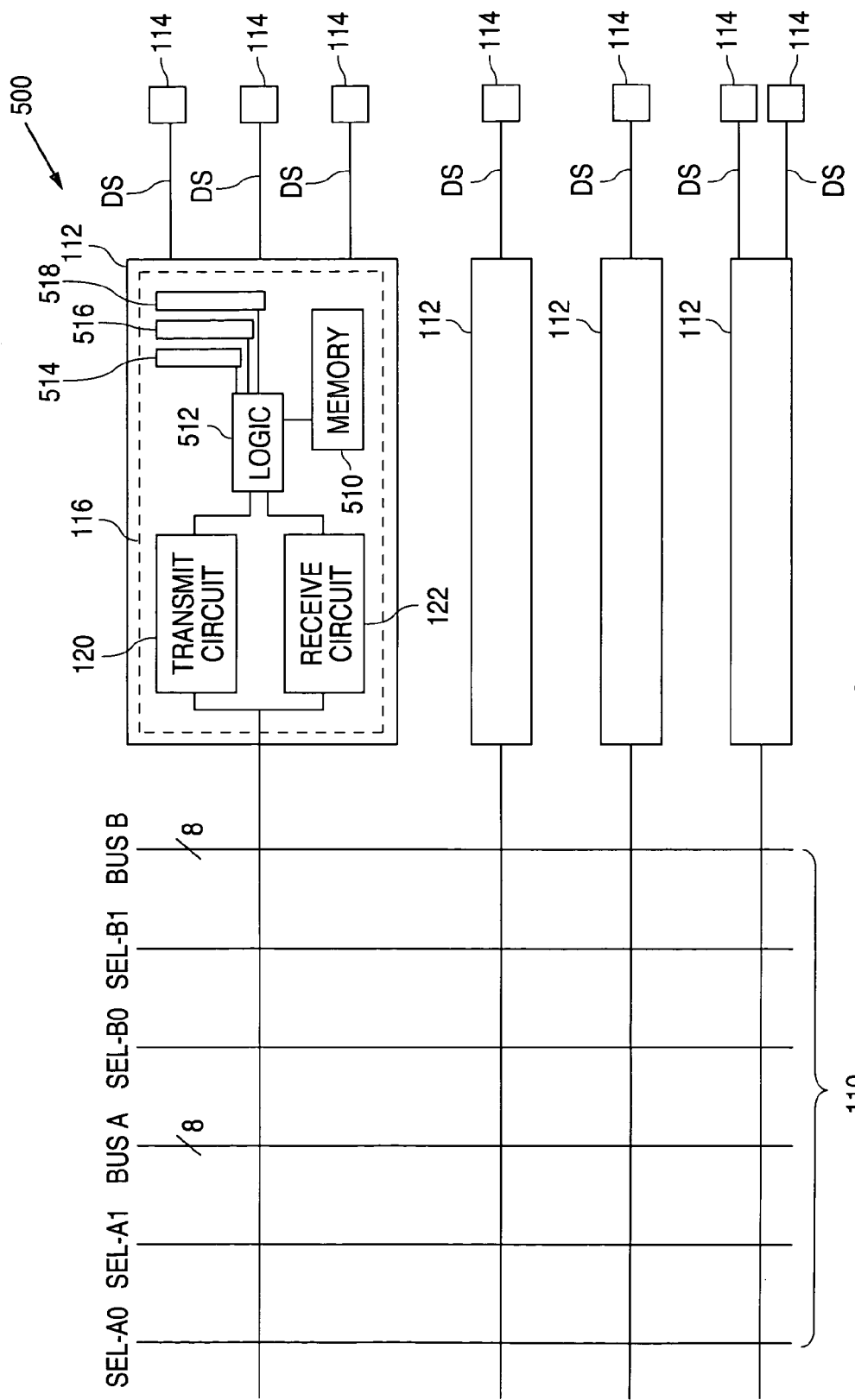
FIG. 5 is a block diagram illustrating an example of a bus-based communications system 500 in accordance with the present invention.

FIG. 5 shows a block diagram that illustrates an example of a bus-based communications system 500 in accordance with the present invention. System 500 is similar to system 100 and, therefore, utilizes the same reference numerals to designate the structures which are common to both systems.

As shown in FIG. 5, system 500 differs from system 100 in that system 500 includes a memory 510 that stores grant information that is associated with each of a number of arbitration periods. The grant information, which can be organized as a Priority Table, can be stored in a number of memory devices, including registers and non-volatile memory cells.

An example of a Priority Table is shown below. The Priory Table includes a sequential number of physical addresses that represent a corresponding number of rows of data where each row corresponds with an arbitration period. (As described above, an arbitration period can be a 26 clock cycle period where requests are received during a request period and a grant is output.) Thus, a Priority Table that is 512 rows long represents 512 consecutive arbitration periods.

| Priority Table | | | | |
|---|---|---|---|---|
| Physical Address | Arbitration Period | Valid Status | Stored Priority | Stored Identity |
| 000000000 | 1 | X | XX | XXXXX |
| 000000001 | 2 | X | XX | XXXXX |
| 000000010 | 3 | X | XX | XXXXX |
| ... | ... | ... | ... | ... |
| 111111111 | 512 | X | XX | XXXXX |

As shown in the example Priority Table, each row includes a valid status field, a stored identity field, and a stored priority field. The valid status field indicates whether the row of data associated with the arbitration period is valid. The stored identity field identifies a communication circuit 116, while the stored priority field indicates a priority level of a data cell to be transmitted by the communication circuit.

For example, each row of data can include five bits [bits 4:0] of a stored identity field that identify a communication circuit 116, two bits [bits 6:5] of stored priority field that identify one of four priority levels, and a one bit field [bit 7] of valid status that indicates whether the data in the row associated with the arbitration period is valid.

The four priority levels include a high priority level represented by, for example, a 0-0, and a medium priority level represented by, for example, a 0-1. In addition, the four priority levels also include a low priority level represented by, for example, a 1-0, and an all priority level represented by, for example, a 1-1.

As further shown in FIG. 5, system 500 also differs from system 100 in that system 500 includes a logic circuit 512 that determines which of a number of requesting communication circuits 116 is next to receive control of a bus. In addition, logic circuit 512 writes the grant information of the communication circuits 116 to various addresses within memory 510.

In addition, system 500 includes a high priority register 514 that indicates whether the high priority data received by a communication circuit 116 is arbitration, such as round robin, enabled. System 500 also includes a medium priority register 516 that indicates whether the medium priority data received by the communication circuit 116 is arbitration enabled, and a low priority register 518 that indicates whether the low priority data received by the communication circuit 116 is arbitration enabled.

Figure 1:
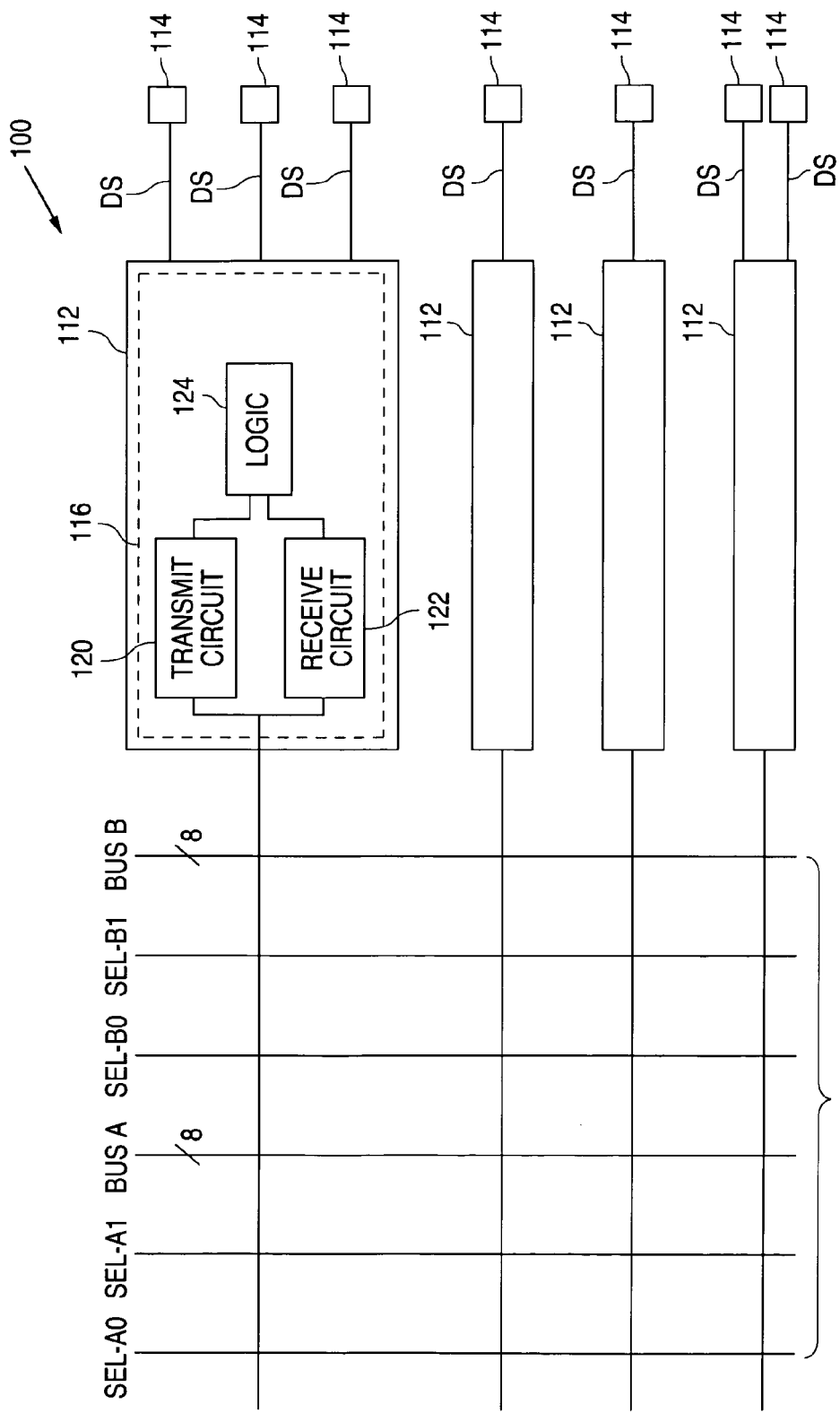
FIG. 1 is a block diagram illustrating a conventional bus-based communications system 100.
Figure 2:
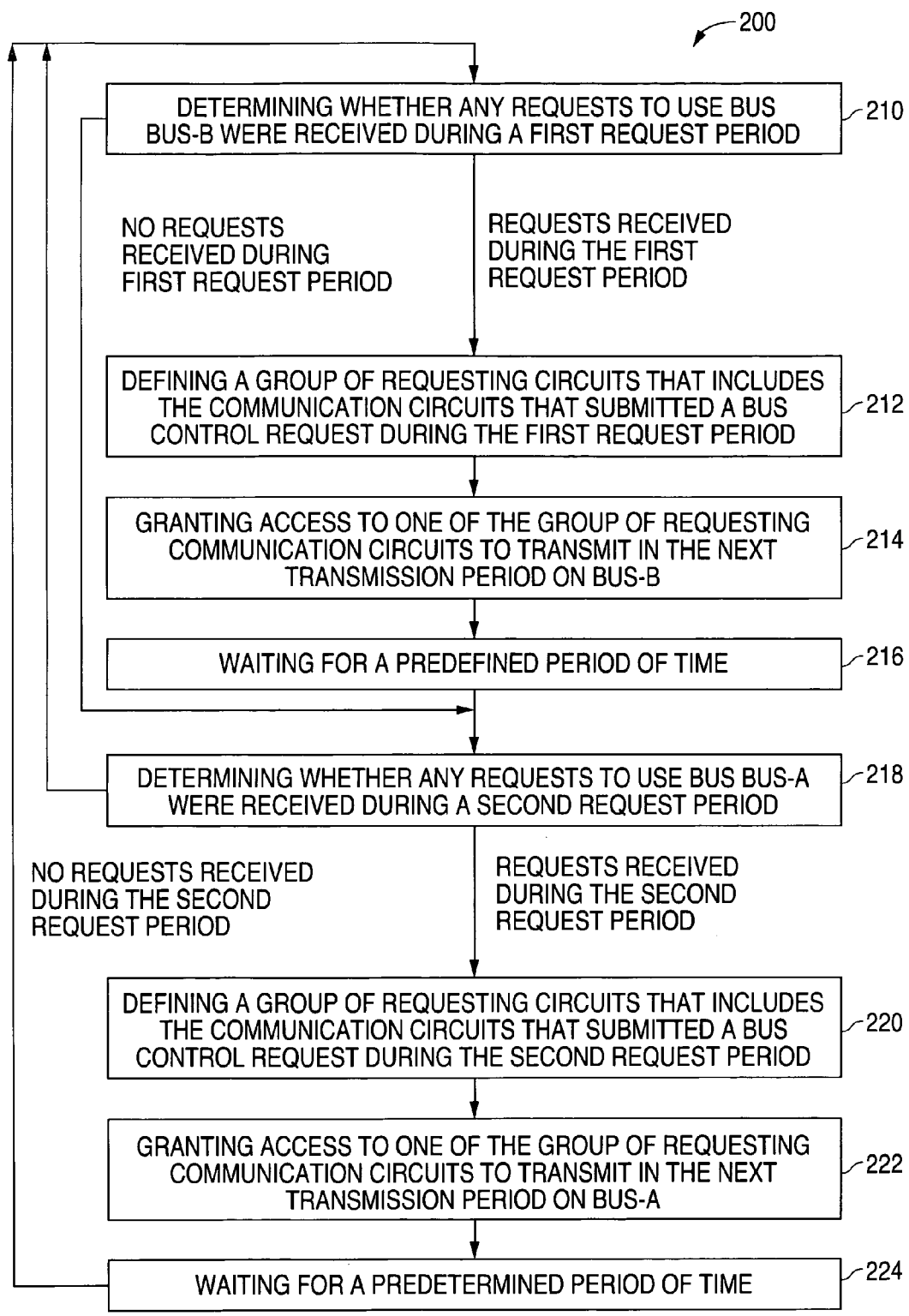
FIG. 2 is a state diagram illustrating a prior art state machine 200 operating as a bus master.
Figure 3:
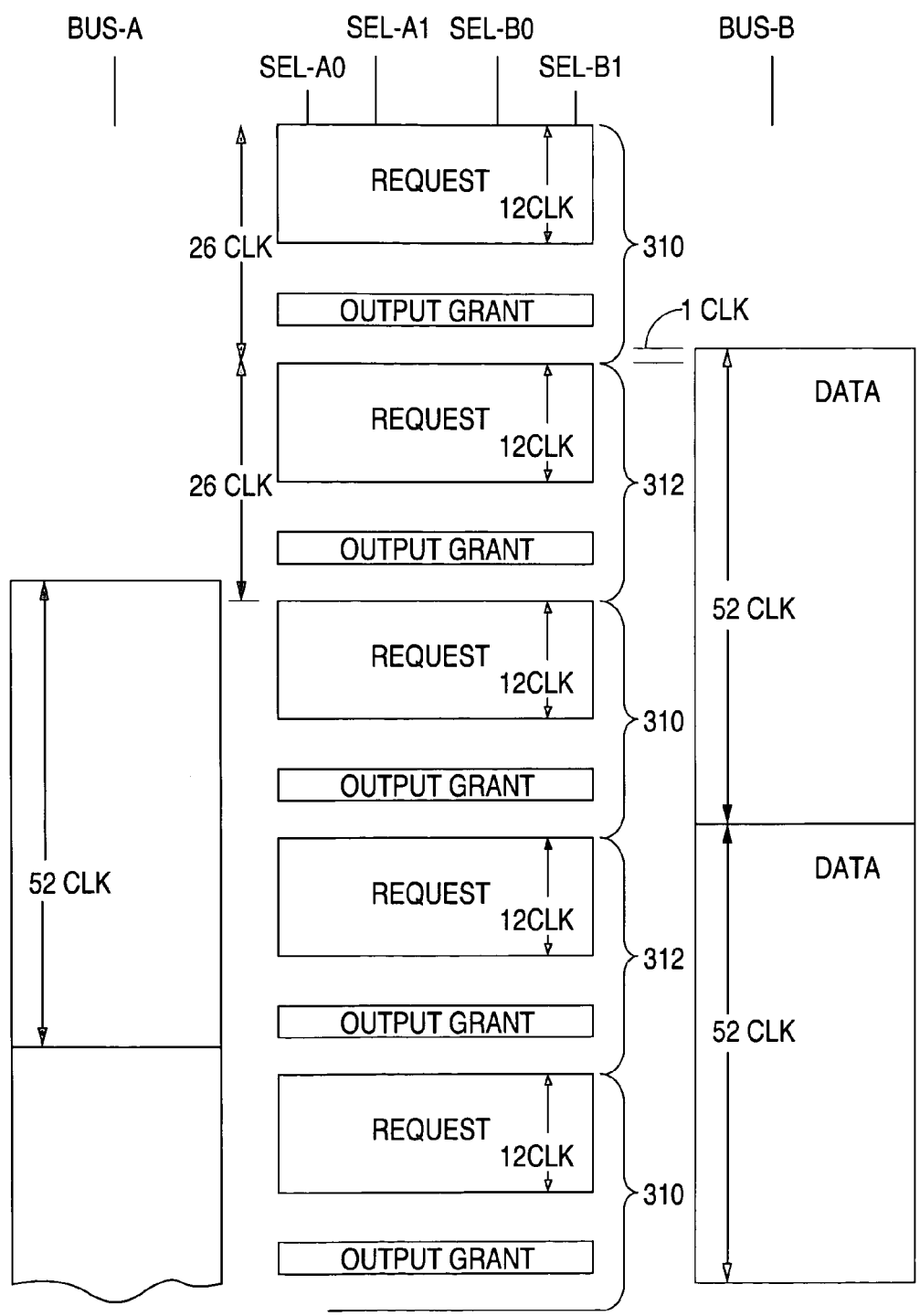
FIG. 3 is a graphical representation further illustrating prior art state machine 200.
Figure 4:
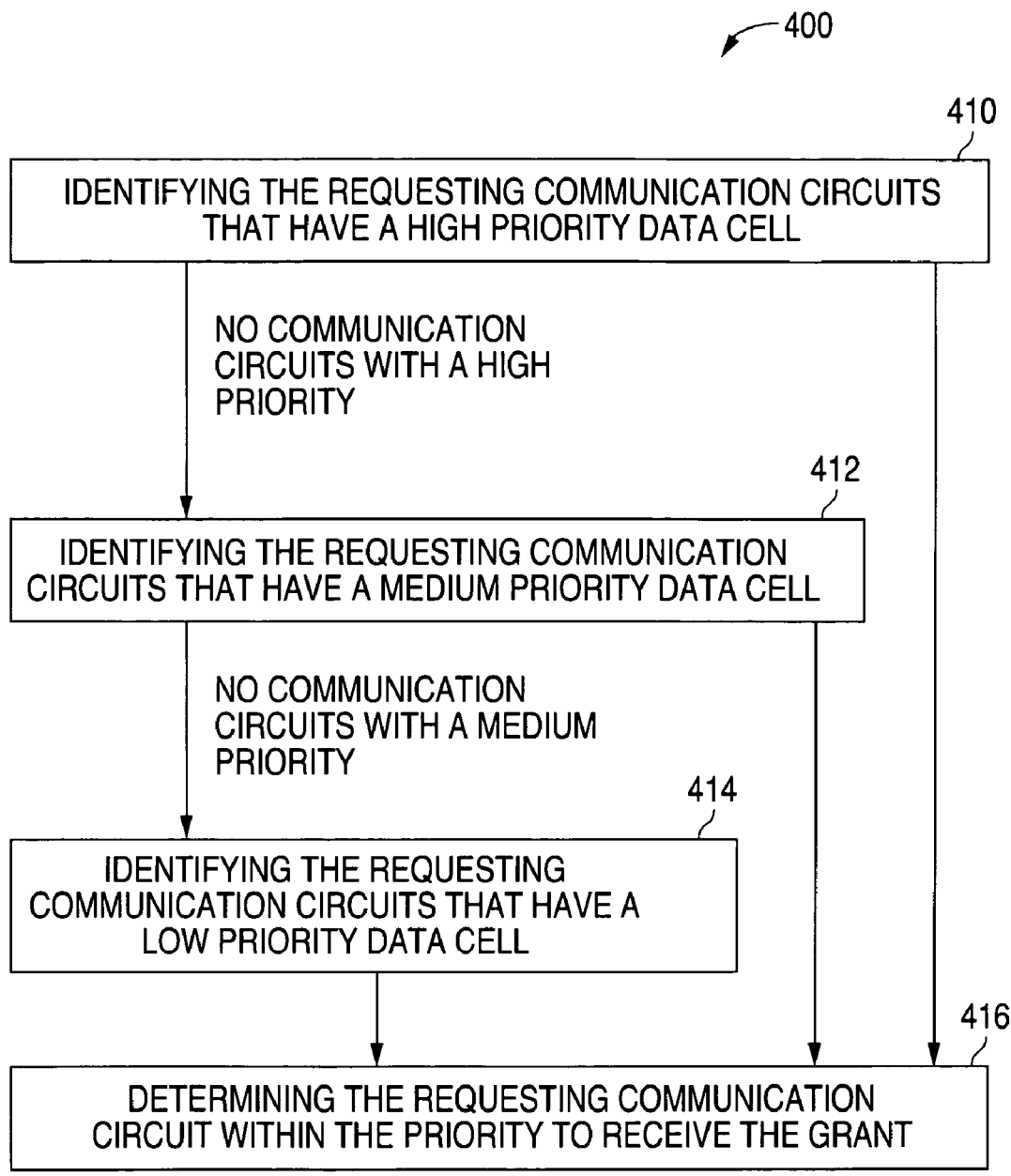
FIG. 4 is a flow chart illustrating a prior art method 400 of granting access to a bus to one of a number of requesting communication circuits.
Figure 6:
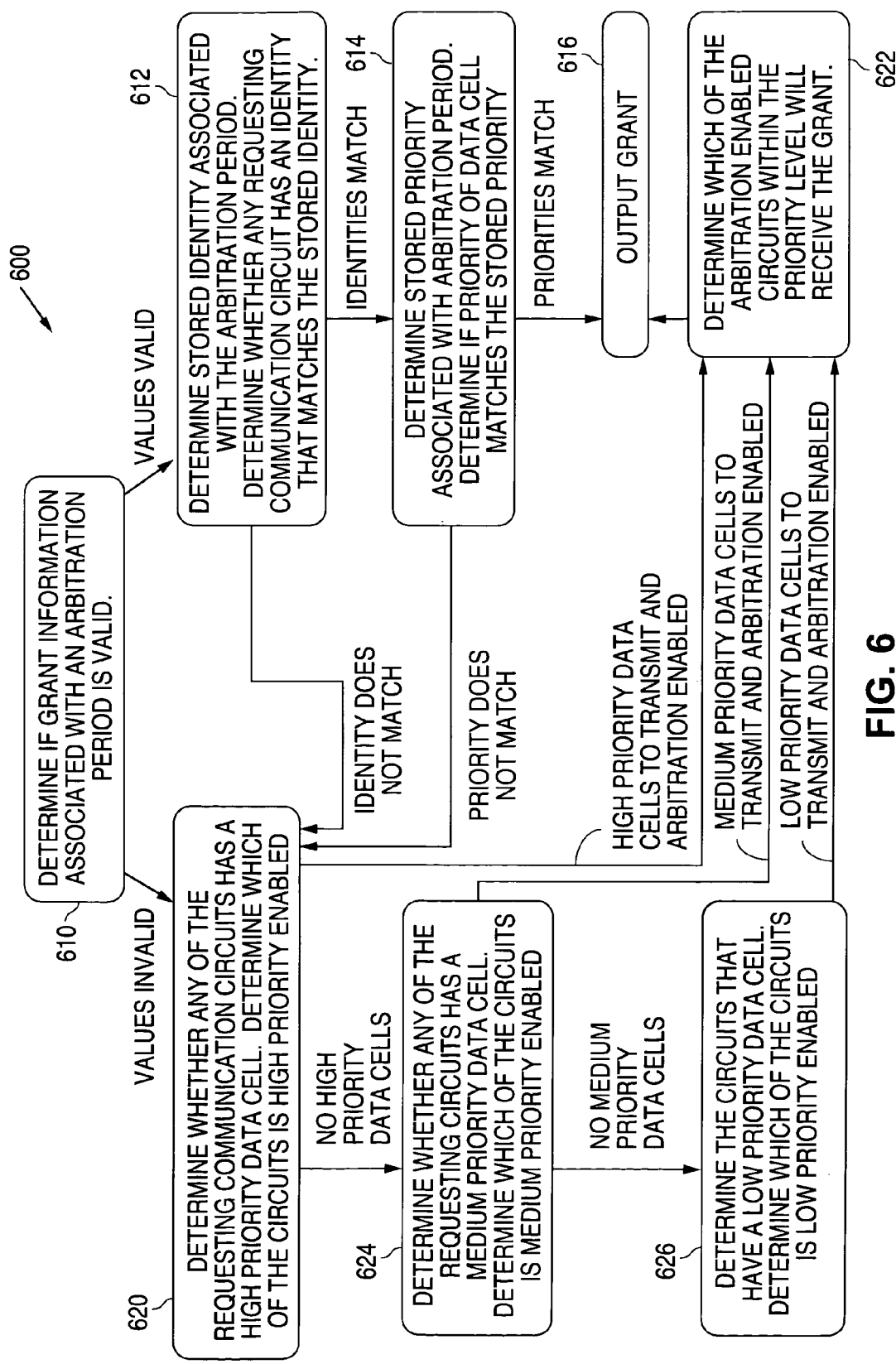
FIG. 6 is a state diagram illustrating an example of a state machine 600 that grants access to a bus to one of a number of requesting communication circuits in accordance with the present invention.

System 500 can operate the same as state machine 200 in determining a group of requesting circuits, as illustrated in states 210, 212, 218, and 220 shown in FIG. 2. FIG. 6 shows a state diagram that illustrates an example of a state machine 600 that grants access to a bus to one of a number of requesting communication circuits in accordance with the present invention. State machine 600 can be used to implement states 214 and 222 shown in FIG. 2.

In the present example, the logic circuit 512 of the bus master has determined the requesting communication circuits that submitted a bus control request to the bus master during the same request period of an arbitration period, such as in states 210, 212, 218, and 220. Method 600 can be executed by the memory 510 and logic circuit 512 of the communication circuit 116 that is the bus master in system 500.

As shown in FIG. 6, state machine 600 begins at state 610 by determining if the grant information that is associated with the arbitration period, such as the information stored in the row of the Priority Table that corresponds with the arbitration period, is valid, such as by checking the valid bit field in the row of the Priority Table. The row of the Priority Table is selected to correspond with the arbitration period. For example, the first row of the table can correspond with the first arbitration period, and the $513^{th}$ arbitration period when a 512 row Priority Table is used.

When the valid bit field indicates that the information is valid, state machine 600 moves to state 612 to determine the identity in the stored identity field that is associated with the arbitration period. For example, the identity can be determined by checking the identity bits in the row of the Priority Table that corresponds with the arbitration period. In addition, state machine 600 also determines in state 612 whether any requesting communication circuit has an identity that matches the identity in the stored identity field.

When a requesting communication circuit has an identity that matches the identity in the stored identity field, state machine 600 moves to state 614 to identify the requesting communication circuit as a matching communication circuit, and determine the priority in the stored priority field that is associated with the arbitration period, such as by checking the priority bits in the row of the Priority Table that corresponds with the arbitration period. In addition, state machine 600 also determines in state 614 whether the priority of the data cell of the matching communication circuit matches the priority in the stored priority field read from the row of the Priority Table.

When the priority of the data cell of the matching communication circuit matches the priority in the stored priority field, state machine 600 moves to state 616 to output a grant to the matching communication circuit. The grant gives the matching communication circuit 116 permission to transmit during the next transmission period on a bus.

In state 610 when the grant information is invalid, in state 612 when a requesting communication circuit does not have an identity that matches the identity in the stored identity field, and in state 614 when the matching communication circuit does not have a priority that matches the priority in the stored priority field, state machine 600 moves to state 620 to determine whether any of the requesting communication circuits 116 wishes to transmit a high priority data cell. In addition, state machine 600 also determines in state 620 which of the high priority communications circuits are also arbitration enabled, such as by checking the high priority registers 514 on the communication circuits 116.

When an arbitration-enabled requesting communication circuit has a high priority data cell, state machine 600 moves to state 622 to determine which of the arbitration enabled communication circuits within the priority level will receive the grant (permission to transmit during the next transmission period).

When several requesting communication circuits 116 have the same priority level, the requesting communication circuit 116 to receive the grant can be defined by an arbitration, such as a declining round robin. As noted above, in a declining round robin, the requesting communication circuits 116 circulate within a hierarchical ranking.

After state machine 600 has selected a communication circuit from the arbitration, state machine 600 moves to state 616 to send a grant to the selected communication circuit. The grant gives the selected communication circuit 116 permission to transmit during the next transmission period on the bus.

If no communication circuits with a high priority data cell requested control, state machine 600 moves to state 624 to identify the requesting communication circuits 116 that wish to transmit a medium priority data cell. In addition, state machine 600 also determines in state 624 which of the medium priority communications circuits are also arbitration enabled, such as by checking the medium priority registers 516 on the communication circuits 116.

When an arbitration-enabled requesting communication circuit has a medium priority data cell, state machine 600 moves to state 622 to determine which of the communication circuits within the priority level will receive the grant (permission to transmit during the next transmission period). As above, the requesting communication circuit 116 to receive the grant can be defined by an arbitration, such as a declining round robin.

If no communication circuits with a medium priority data cell requested control, state machine 600 moves to state 626 to identify the requesting communication circuits that wish to transmit a low priority data cell. In addition, state machine 600 also determines in state 626 which of the low priority communications circuits are also arbitration enabled, such as by checking the low priority registers 518 on the communication circuits 116.

When an arbitration-enabled requesting communication circuit has a low priority data cell, state machine 600 moves to state 622 to determine which of the communication circuits within the priority level will receive the grant (permission to transmit during the next transmission period).

As above, the requesting communication circuit 116 to receive the grant can be defined by an arbitration, such as a declining round robin. (State machine 600 can alternately be implemented in software.)

One of the advantages of the Priority Table is that the Priority Table insures that communication circuits with low priority data streams receive a minimum level of service. For example, to insure that a communication circuit 116 with a low priority data cell is able to transmit at least once every 512 arbitration cycles, where the Priority Table has 512 rows, the communication circuit 116 can be listed in one row with a low priority level type.

If a low priority data cell of the communication circuit 116 is to receive only one grant every 512 arbitration periods, then the low priority register 518 on the communication circuit 116 is set to prevent arbitration. If the low priority data cell of the communication circuit 116 is to receive at least one grant, but maybe more than one grant, every 512 arbitration periods, then the low priority register 516 is set to allow arbitration.

Another advantage is that the Priority Table can insure that communication circuits with a high priority data stream receive a known level of service. For example, to insure that a communication circuit 116 with a high priority data stream is able to transmit 150 times every 512 arbitration cycles, where the Priority Table has 512 rows, the communication circuit 116 can be listed in 150 rows with a high priority level type, and arbitration register 514 set to prevent arbitration.

Thus, not only does the Priority Table limit the bandwidth that a high priority user can have, thereby allowing low priority users to transmit on the bus, the present invention also guarantees the high priority user a predetermined bandwidth that is free from competition from other high priority users. Other levels of service can also be provided by varying the priority level and the enable status.

Thus, a communication circuit 116 receives control of a bus based on the contents of the Priority Table. One way to enter data into the Priority Table is to enter the data sequentially. For example, assume a first communication circuit 116 is to receive control of a bus 32 times every 512 arbitration periods.

In this example, the first 32 physical addresses of the Priority Table in memory 510 are assigned to the first communication circuit 116. In other words, the grant information assigned to the first 32 rows of the Priority Table have stored identity fields that are set to identify the first communication circuit 116.

Next, assume a second communication circuit 116 is to receive control of a bus 128 times every 512 arbitration periods, and a third communication circuit 116 is to receive control of a bus 64 times every 512 arbitration periods. In this example, the next 128 physical addresses of the Priority Table in memory 510 are assigned to the second communication circuit 116, while the following 64 physical addresses of the Priority Table in memory 510 are assigned to the third communication circuit 116.

In other words, the grant information assigned to the next 128 rows of the Priority Table have stored identity fields that are set to identify the second communication circuit 116, and the grant information assigned to the following 64 rows of the Priority Table have stored identity fields that are set to identify the third communication circuit 116.

Although this approach is straight forward, this approach also requires that each communication circuit 116 have large amounts of memory to buffer the data cells. For example, assume that 16 communication circuits each want control of a bus 32 times during 512 arbitration periods (16*32=512), and that the grant information is entered sequentially in memory 510.

In this example, the first 32 arbitration periods grant control of the bus to the first communication circuit 116, which passes 32 sequential cells at the maximum rate of the cell bus interface, such as a rate of 480 Mbps. Since first communication circuit 116 outputs such a large burst of data, extensive buffering is required to hold the data.

In the present example, the ideal configuration would be to equally space out the grants to each communication circuit 116 by sequentially granting control of a bus to each of the 16 communication circuits 116. In the ideal configuration, the first communication circuit 116 passes one cell.

Next, the second communication circuit passes one cell, the third communication circuit then passes one cell, and so on. As a result, each communication circuit 116 passes one cell each 16 arbitration periods. Thus, the ideal configuration reduces the size of the data burst from 32 consecutive cells each 512 arbitration periods to one cell each 16 arbitration periods. Therefore, although the same number of cells is transferred during 512 arbitration periods, the size of the memory required to buffer the data can be substantially reduced.

It is often the case, however, that the number of communication circuits and the number of arbitration periods allocated to each communication circuit vary widely. As a result, it is a non-trivial task to equally space out the bus grants to reduce the buffering requirements of the communication circuits. Further, once the spaced apart memory locations for the bus grant information have been determined, substantially more operator input time would be required to manually enter the grant information into the proper spaced-apart memory locations.

In the present invention, a scrambling operation is utilized to roughly space apart the bus grants a communication circuit 116 receives during a period of time, such as 512 arbitration periods, so that the arbitration periods used by each communication circuit can be entered as blocks of logical addresses. As a result, an operator need only enter, for example, that the first communication circuit is to receive 32 arbitration periods, the second communication circuit is to receive 128 arbitration periods, and the third communication circuit is to receive 64 arbitration periods.

Figure 7:
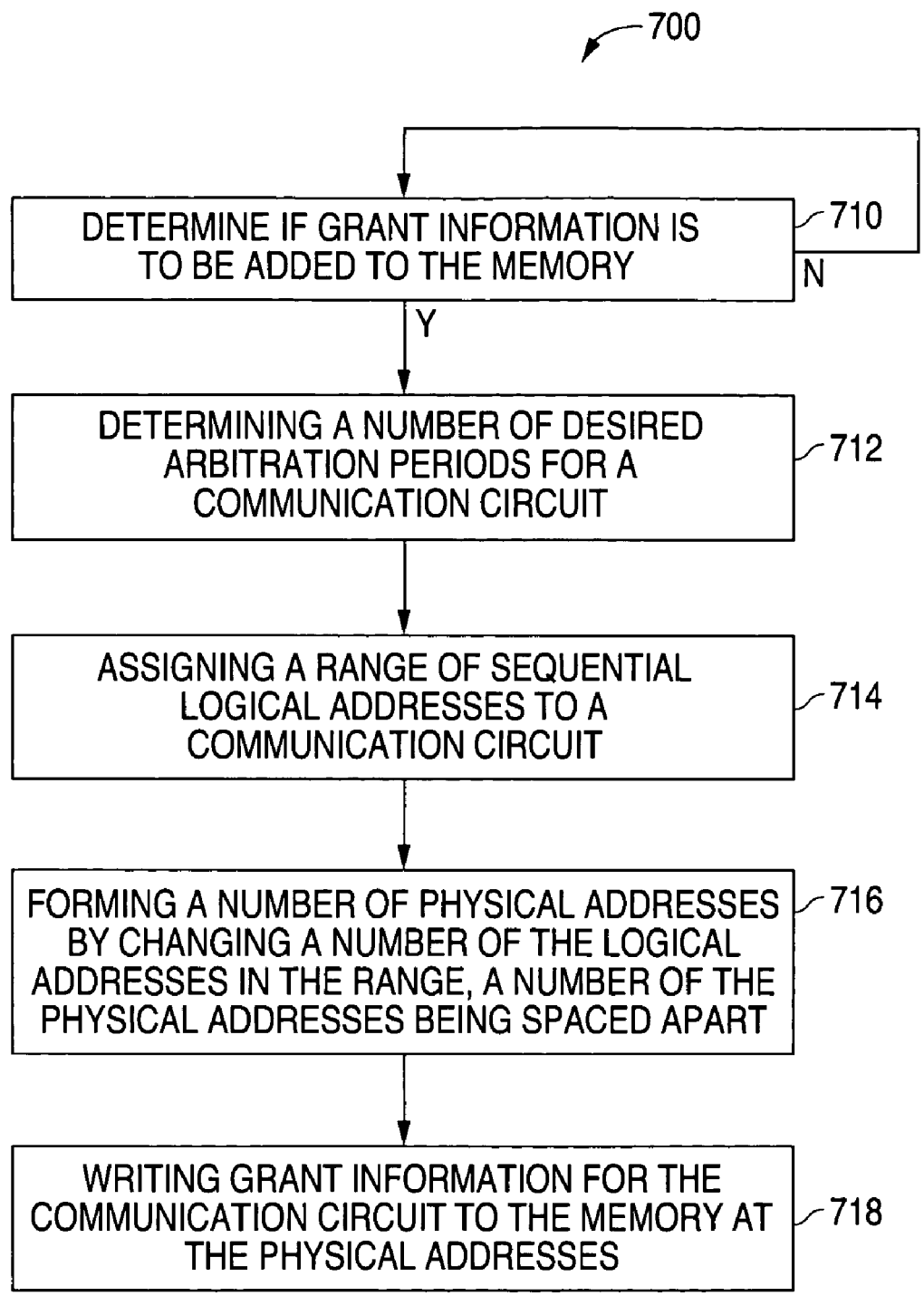
FIG. 7 is a state diagram illustrating an example of a state machine 700 that adds grant information to a memory in accordance with the present invention.

FIG. 7 shows a state diagram that illustrates an example of a state machine 700 that adds grant information to a memory in accordance with the present invention. The memory can be implemented with, for example, memory 510, and has a number of physical addresses. The physical addresses correspond with a number of arbitration periods, such as 512, where the number of arbitration periods includes assigned arbitration periods and available arbitration periods. State machine 700 can be implemented in, for example, logic circuit 512.

As shown in FIG. 7, state machine 700 begins at state 710 by determining if grant information is to be added to the memory. When grant information is to be added, state machine 700 moves to step 712 to determine a number of desired arbitration periods requested by a communication circuit.

In the present example, the number of desired arbitration periods is pre-screened to insure that sufficient arbitration periods are available. Alternately, state machine 700 can also compare the number of desired arbitration periods with the number of available arbitration periods in step 712 and, if an insufficient number of arbitration periods are available, state machine 700 can output an error message. The error message can indicate, for example, that an insufficient number of arbitration periods is available.

Once the desired number of arbitration periods has been determined, state machine 700 moves to step 714 to assign a range of sequential logical addresses to the communication circuit. The number of logical addresses in the range, in turn, is equal to the number of desired arbitration periods.

In addition, the memory has a value that represents a next available logical address. When a range of sequential logical addresses is assigned, the first logical address of the range is the next available logical address. In addition, the value that represents the next available logical address is updated by adding the number of logical addresses in the range to a prior value that represented the next available logical address.

For example, assume that a first communication circuit has 16 arbitration periods and was assigned the range of sequential logical addresses from 000000000 to 000001111. In this example, the value of the next available logical address is one more or 000010000. When a second communication circuit with 16 arbitration periods is added, a range of logical addresses that runs from 000010000 to 000011111 is assigned to the communication circuit. In this case, the next available logical address is updated by adding 16 logical addresses to the prior value of 000010000 to obtain an updated value of 000100000.

When a range of logical addresses has been assigned, state machine 700 moves to step 716 to form a number of physical addresses, where a number of the physical addresses are spaced apart, by changing a number of the logical addresses in the range. Thus, when the range of logical addresses includes more than one logical address, a number of the physical addresses can be spaced apart, e.g., non-sequential, in an address space that represents a predefined time period such as, for example, 512 arbitration periods.

Next, state machine 700 moves to step 718 to write grant information for the communication circuit to the memory at the physical addresses. In addition to identifying the communication circuit, the grant information also includes priority information and validity information.

One approach to changing the logical addresses is to use a permutation, such as a reverse permutation. One example of a permutation in accordance with the present invention is shown in the Transformation Table where a logical address is transformed into a physical address.

| Transformation Table | |
|---|---|
| Logical Address by bit position | 8 7654 3210 |
| Physical Address by bit position | 0 1234 5678 |

As shown in the Transformation Table, the value of the least significant bit in the physical address is set to have the value of the most significant bit, bit 8, in the logical address. In addition, the value of the next least significant bit in the physical address is set to have the value of the next most significant bit, bit 7, in the logical address. Each bit in the physical address is similarly changed.

The First Example Table shows an example of obtaining physical addresses from three-bit logical addresses by using the permutation illustrated in the Transformation Table.

| First Example Table | | | | |
|---|---|---|---|---|
| Com Circuit | Arb Period | Logical Address | Physical Address | Arb Period |
| A | 0 | 000 | 000 | 0 |
| A | 1 | 001 | 100 | 4 |
| A | 2 | 010 | 010 | 2 |
| A | 3 | 011 | 110 | 6 |
| B | 4 | 100 | 001 | 1 |
| B | 5 | 101 | 101 | 5 |
| C | 6 | 110 | 011 | 3 |
| C | 7 | 111 | 111 | 7 |

As shown in the First Example Table, communication circuit A has been assigned logical addresses 000 to 011 (which correspond to arbitration periods 0–3), communication circuit B has been assigned logical addresses 100 to 101 (which correspond with arbitration periods 4–5), and communication circuit C has been assigned logical addresses 110 to 111 (which correspond with arbitration periods 6–7).

However, after each logical address has been processed using the permutation shown in the Transformation Table, the resulting physical addresses are spaced apart. For example, instead of having arbitration periods 0–3, communication circuit A now has arbitration periods 0, 2, 4, and 6. In addition, instead of having arbitration periods 4 and 5, communication circuit B now has arbitration periods 1 and 5. Further, instead of having arbitration periods 6 and 7, communication circuit C now has arbitration periods 3 and 7.

Statistical analysis of the permutation shown in the Transformation Table using blocks of grants between 10 and 50 arbitration periods, a 512-row table, a standard deviation $\sigma=44.2\%$, a mean $\mu=100\%$, and a maximum error margin $\epsilon=1\%$, indicates that 34.9% of the time the timing between bus grants to the same communication circuit (where adjacent cells are output by the communication circuit) will be within 80 to 120% of an ideal timing (where the bus grants are equally spaced-apart).

Thus, one of the advantages of the present invention is that the present invention provides a scrambling operation that spaces apart the grants that a communication circuit 116 receives during a period of time, such as 512 arbitration periods. As a result, the present invention allows an operator to enter the number of arbitration periods that a communication circuit is to receive in blocks of sequential logical address ranges, while at the same time spacing apart the physical addresses, thereby significantly reducing the buffering required by the communication circuits 116.

Another example of a permutation in accordance with the present invention is a two-step process where the range of logical addresses is first processed to intermediate addresses by gray encoding, and then the intermediate addresses are processed into physical addresses using the permutation shown in the Transformation Table.

The Second Example Table shows an example of obtaining the physical addresses from three bit logical address by using the two-step process.

Second Example Table

| Com Circuit | Arb Period | Logical Address | Inter Address | Physical Address | Arb Period |
|---|---|---|---|---|---|
| A | 0 | 000 | 000 | 000 | 0 |
| A | 1 | 001 | 001 | 100 | 4 |
| A | 2 | 010 | 011 | 110 | 6 |
| A | 3 | 011 | 010 | 010 | 2 |
| B | 4 | 100 | 110 | 011 | 3 |
| B | 5 | 101 | 100 | 001 | 1 |
| C | 6 | 110 | 101 | 101 | 5 |
| C | 7 | 111 | 111 | 111 | 7 |

Like the First Example Table, communication circuit A has been assigned logical addresses 000 to 011 (which correspond to arbitration periods 0–3), communication circuit B has been assigned logical addresses 100 to 101 (which correspond with arbitration periods 4–5), and communication circuit C has been assigned logical addresses 110 to 111 (which correspond with arbitration periods 6–7).

However, unlike the First Example Table, the logical addresses are first processed by a gray code to form a corresponding number of intermediate addresses. Following this, the intermediate addresses are processed using the permutation illustrated in the Transformation Table to form the physical addresses.

For example, instead of having arbitration periods 0–3, communication circuit A now has arbitration periods 0, 2, 4, and 6. In addition, instead of having arbitration periods 4 and 5, communication circuit B now has arbitration periods 1 and 3. Further, instead of having arbitration periods 6 and 7, communication circuit C now has arbitration periods 5 and 7.

Statistical analysis of the two-step process using the gray code and the permutation shown in the Transformation Table, and blocks of grants between 10 and 50 arbitration periods, a 512-row table, a standard deviation $\sigma=40.7\%$, a mean $\mu=100\%$, and a maximum error margin $\epsilon=1\%$, indicates that 37.7% of the time the timing between bus grants to the same communication circuit (where adjacent cells are output by the communication circuit) will be within 80 to 120% of an ideal timing (where the bus grants are equally spaced-apart).

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of adding grant information to a memory that stores information about a series of arbitration periods, the method comprising:

assigning a number of first addresses to a group of devices such that two or more consecutive first addresses are assigned to each device and no two devices have the same first addresses, the number of first addresses representing a corresponding number of arbitration periods such that each first address represents one arbitration period, each first address having a sequence of bits; and forming a number of second addresses from the number of the first addresses such that each first address has a corresponding second address and each second address has a corresponding device by rearranging the sequence of bits in a plurality of the number of first addresses, each second address representing one arbitration period.

2. The method of claim 1 and further comprising for each second address, writing grant information to the memory about the corresponding device.

3. The method of claim 2 wherein each device is assigned only consecutive first addresses.

4. A method of adding grant information to a memory that stores information about a series of arbitration periods, the method comprising:

assigning a number of first addresses to a group of devices such that two or more consecutive first addresses are assigned to each device and no two devices have the same first addresses, the number of first addresses representing a corresponding number of arbitration periods such that each first address represents one arbitration period, each first address having a sequence of bits, each device being assigned only consecutive first addresses, first addresses being assigned to a first device, and second addresses being formed for the first device before first addresses are assigned to a second device;

forming a number of second addresses from the number of the first addresses such that each first address has a corresponding second address and each second address has a corresponding device by rearranging the sequence of bits in a plurality of the number of first addresses, each second address representing one arbitration period; and for each second address, writing grant information to the memory about the corresponding device.

5. A method of adding grant information to a memory that stores information about a series of arbitration periods, the method comprising:

assigning a number of first addresses to a group of devices such that two or more consecutive first addresses are assigned to each device and no two devices have the same first addresses, the number of first addresses representing a corresponding number of arbitration periods such that each first address represents one arbitration period, each first address having a sequence of bits; and forming a number of second addresses from the number of the first addresses such that each first address has a corresponding second address and each second address has a corresponding device by rearranging the sequence of bits in a plurality of the number of first addresses, each second address representing one arbitration period, the sequence of bits being rearranged by:

setting a least significant bit of a second address to have a value equal to a most significant bit in a first address; and setting a first next to the least significant bit of the second address to have a value equal to a first next to the most significant bit in the first address.

6. The method of claim 5 and further comprising setting a second next to the least significant bit of the second address to have a value equal to a second next to the most significant bit in the first address.

7. A method of adding grant information to a memory that stores information about a series of arbitration periods, the method comprising:

assigning a number of first addresses to a group of devices such that two or more consecutive first addresses are assigned to each device and no two devices have the same first addresses, the number of first addresses representing a corresponding number of arbitration periods such that each first address represents one arbitration period, each first address having a sequence of bits; and forming a number of second addresses from the number of the first addresses such that each first address has a corresponding second address and each second address has a corresponding device by rearranging the sequence of bits in a plurality of the number of first addresses, each second address representing one arbitration period, the sequence of bits being rearranged by:

gray encoding a first address to form an intermediate address;

setting a least significant bit of a second address to have a value equal to a most significant bit in the intermediate address; and setting a first next to the least significant bit of the second address to have a value equal to a first next to the most significant bit in the intermediate address.

8. The method of claim 7 and further comprising setting a second next to the least significant bit of the second address to have a value equal to a second next to the most significant bit in the intermediate address.

9. A communications circuit comprising:
a transmit circuit that transmits information onto a bus;
a receive circuit that receives information from the bus;
a memory that stores information on a series of arbitration periods; and
a logic circuit connected to the transmit circuit, the receive circuit, and the memory, if grant information for a group of devices is to be added to the memory, the logic circuit assigns a number of first addresses to the group of devices such that two or more consecutive first addresses are assigned to each device and no two devices have the same first addresses, the number of first addresses representing a corresponding number of arbitration periods such that each first address represents one arbitration period, each first address having a sequence of bits, the logic circuit forming a number of second addresses from the number of the first addresses such that each first address has a corresponding second address and each second address has a corresponding device by rearranging the sequence of bits in a plurality of the number of first addresses, each second address representing one arbitration period.

10. The communications circuit of claim 9 wherein the logic circuit forms the second addresses by:
gray encoding a first address to form an intermediate address;
setting a least significant bit of a second address to have a value equal to the most significant bit in the intermediate address; and
setting a first next to the least significant bit of the second address to have a value equal to a first next to the most significant bit in the intermediate address.

11. A communications circuit comprising:
a transmit circuit that transmits information onto a bus;
a receive circuit that receives information from the bus;
a memory that stores information on a series of arbitration periods; and
a logic circuit connected to the transmit circuit, the receive circuit, and the memory, if grant information for a group of devices is to be added to the memory, the logic circuit assigns a number of first addresses to the group of devices such that two or more consecutive first addresses are assigned to each device and no two devices have the same first addresses, the number of first addresses representing a corresponding number of arbitration periods such that each first address represents one arbitration period, each first address having a sequence of bits, the logic circuit forming a number of second addresses from the number of the first addresses such that each first address has a corresponding second address and each second address has a corresponding device by rearranging the sequence of bits in a plurality of the number of first addresses, each second address representing one arbitration period, the logic circuit forming the second addresses by:

setting a least significant bit of a second address to have a value equal to the most significant bit in a first address; and setting a first next to the least significant bit of the second address to have a value equal to a first next to the most significant bit in the first address.

12. A method of adding grant information to a memory that stores information about a series of arbitration periods, the method comprising:

assigning a number of first addresses to a device, the number of first addresses representing a corresponding number of arbitration periods such that each first address represents one arbitration period, each first address having a sequence of bits;

forming a number of second addresses from the number of the first addresses such that each first address has a corresponding second address by rearranging the sequence of bits in a plurality of the number of first addresses, the first addresses and second addresses having an equal number of bits, each second address representing one arbitration period; and storing information in the memory about the device at each location defined by a second address.

13. The method of claim 12 wherein the rearranging includes:
setting a least significant bit of a second address to have a value equal to a most significant bit in a first address; and
setting a first next to the least significant bit of the second address to have a value equal to a first next to the most significant bit in the first address.

14. The method of claim 13 wherein the rearranging further includes setting a second next to the least significant bit of the second address to have a value equal to a second next to the most significant bit in the first address.

15. The method of claim 12 wherein forming further includes:
gray encoding a first address to form an intermediate address;
setting a least significant bit of a second address to have a value equal to a most significant bit in the intermediate address; and
setting a first next to the least significant bit of the second address to have a value equal to a first next to the most significant bit in the intermediate address.

16. A method of adding grant information to a memory that stores information on a series of arbitration periods, the method comprising:
assigning a number of first addresses to a device, the number of first addresses representing a corresponding number of arbitration periods such that each first address represents one arbitration period, no two first addresses being identical, each first address having a sequence of bits; and forming a number of second addresses from the number of the first addresses such that each first address has a corresponding second address by rearranging the sequence of bits in a plurality of the number of first addresses, each second address representing one arbitration period, no two second addresses being identical.

17. A method of adding grant information to a memory that stores information on a series of arbitration periods, the method comprising:

assigning a number of first addresses to a device, the number of first addresses representing a corresponding number of arbitration periods such that each first address represents one arbitration period, no two first addresses being identical, each first address having a sequence of bits;

forming a number of second addresses from the number of the first addresses such that each first address has a corresponding second address by rearranging the sequence of bits in a plurality of the number of first addresses, each second address representing one arbitration period, no two second addresses being identical; and storing information in the memory about the device at each location defined by a second address.

18. The method of claim 17 wherein the rearranging includes:

setting a least significant bit of a second address to have a value equal to a most significant bit in a first address; and setting a first next to the least significant bit of the second address to have a value equal to a first next to the most significant bit in the first address.

19. The method of claim 18 wherein the rearranging further includes setting a second next to the least significant bit of the second address to have a value equal to a second next to the most significant bit in the first address.

20. The method of claim 17 wherein forming further includes:

gray encoding a first address to form an intermediate address;

setting a least significant bit of a second address to have a value equal to a most significant bit in the intermediate address; and setting a first next to the least significant bit of the second address to have a value equal to a first next to the most significant bit in the intermediate address.

* * * * *